J. H. BROCK.
ROOT PULLER.
APPLICATION FILED FEB. 23, 1916.

1,207,488.

Patented Dec. 5, 1916.

James H. Brock, Inventor

Witnesses

By David P. Moore.
Attorney

UNITED STATES PATENT OFFICE.

JAMES H. BROCK, OF JARVIS, ONTARIO, CANADA.

ROOT-PULLER.

1,207,483.　　　　　Specification of Letters Patent.　　Patented Dec. 5, 1916.

Application filed February 23, 1916. Serial No. 80,005.

*To all whom it may concern:*

Be it known that I, JAMES H. BROCK, a subject of the King of Great Britain, residing at Jarvis, in the county of Haldimand, Province of Ontario, and Dominion of Canada, have invented certain new and useful Improvements in Root-Pullers, of which the following is a specification.

This invention relates to improvements in root pullers or extractors, one object of the invention being the provision of a device of this character especially adapted for pulling and topping beets, carrots and the like.

A further object of the present invention is the provision of a hand tool that is provided with removable cutters so that the beets, carrots or the like may have their tops first cut, and then after the cutters are removed the tool may be pressed into the earth upon opposite sides thereof, to be operated to embrace the roots and thus uproot the same without damaging the bodies of the beets, carrots or the like.

Figure 1:
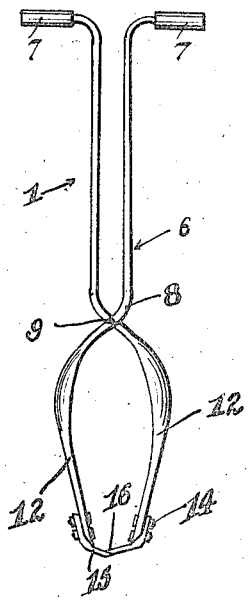
Figure 3:
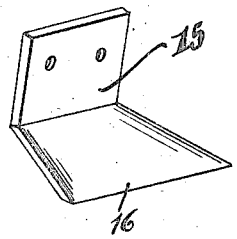
Figure 2:
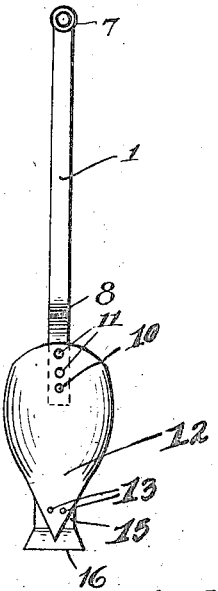
Figure 4:
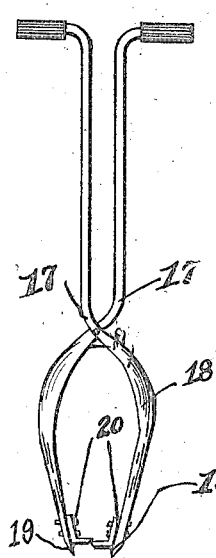

In the accompanying drawings:—Figure 1 is a side elevation of the complete tool. Fig. 2 is a plan view from the inside of one of the members of the tool. Fig. 3 is a perspective view of one of the cutters. Fig. 4 is a side elevation of a modified form of root puller.

Referring to the drawings, the numeral 1 designates one member and 6 the other member of the tool. Each member is provided with an operating handle 7, the shank 8 of which is pivotally connected as at 9, to the shank of the other member. The curved terminal of each shank is provided with rivet openings 10, for the reception of the rivets 11, that attach the spoon shaped root embracing plate or member 12 thereto. In the free end of each plate 12 are provided two bolt receiving apertures 13, for the bolts 14, which removably attach the cutters or blades 15 to the plates 12, the cutting edges 16 being toward each other so that when the plates 12 by the manipulation of the handles are moved together the cutting edges of the blades will coact and sever the tops from the beet or other root, previous to the pulling of the root.

When it is desired to pull the root, the blades 12 are removed and the plates 15 are spread by the handles and then forced downwardly astride the root, being forced toward to embrace the root, at which time the tool is pulled upwardly and carries with it the root.

In the form shown in Fig. 4, shanks 17 and spoon shaped plates 18 are integral, and have formed upon their inner faces intermediate of their ends the shoulders 19, to which are attached the top cutters or blades 20, thus providing a tool that will permit the beet, carrot or the like to be topped and pulled in one operation.

What I claim, as new, is:—

1. A puller of the character described, comprising a pair of members pivotally connected to each other each member being formed with a shank having an operating handle at one end, a clod embracing and earth cutting plate carried by each member, and a cutter detachably mounted upon each plate.

2. A puller of the character described, comprising a pair of members movably connected to each other and having clod embracing and earth cutting means thereon, and top cutters carried by the respective members.

3. A puller of the character described, comprising a pair of members movably connected to each other and having clod embracing and earth cutting means thereon, top cutters carried by the respective members, and means for detachably connecting the top cutters to the members.

In testimony whereof I affix my signature.

JAMES H. BROCK.